UNITED STATES PATENT OFFICE.

JAMES DOUGLAS, JR., OF QUEBEC, CANADA, THOMAS S. HUNT, OF BOSTON, MASS., AND JAMES O. STEWART, OF GEORGETOWN, COLO. TER.

IMPROVEMENT IN EXTRACTING SILVER, GOLD, AND OTHER METALS FROM THEIR ORES.

Specification forming part of Letters Patent No. 151,763, dated June 9, 1874; application filed February 23, 1874.

*To all whom it may concern:*

Be it known that we, JAMES DOUGLAS, Jr., of the city and Province of Quebec, in the Dominion of Canada, THOMAS STERRY HUNT, of the city of Boston, in the State of Massachusetts, one of the United States of America, both British subjects, and JAMES OSCAR STEWART, of Georgetown, Colorado, one of the Territories of the United States, a citizen of the United States, have invented certain new and useful Improvements in the Art of Extracting Silver and Gold from their Ores, constituting a general method for the treatment of silver ores, whether with or without gold, of which the following is a specification:

The mode of procedure differs somewhat, according as the silver ores are associated with much ore of the base metals, zinc and lead, or are free from such admixture. In the first case—that is to say, if ores of zinc and lead are present in considerable quantity, and copper be not present—we add of copper pyrites, or of a mixture of other copper ores, with iron pyrites, so much as shall be found by experience to result in the most thorough extraction of silver. Even a very small percentage is of advantage, and a large excess is in no way objectionable. The ground ore or ores is then calcined with common salt or other chlorides in a suitable furnace, as is usual in the chlorination of silver ores. The charge, when withdrawn is to be treated by agitation or lixiviation in any suitable vessel with a bath consisting of a solution of protochloride of iron and common salt, as in the Hunt and Douglas patent copper process.

The acid fumes from the roasting of pyrites or other sulphureted ores must be passed over or otherwise brought in contact with the bath during its action upon the roasted ore to prevent the loss of protochloride of iron otherwise resulting from the action of the oxides of lead and zinc present. The bath in this part of the process dissolves the copper, besides the zinc and the greater part of the silver, which has been chloridized in the furnace, while the copper in the solution chloridizes silver, which escapes chloridization in the furnace.

After digestion for four or eight hours at a temperature which is best from 120° to 200° Fahrenheit, the solution is drawn off and the silver precipitated by allowing it to remain for some time in contact with sheet-copper, or, better, to filter through two or three boxes with perforated bottoms filled with cement copper. In either case the copper is dissolved and the silver separated in the metallic state. When, however, copper regulus, gray or purple copper ore, copper pyrites, or magnetic iron pyrites can be obtained, it is advantageous to allow the solution holding silver and copper to pass, before going to the metallic copper, through filter-boxes charged with one of these sulphurets—preferably ground copper regulus or a rich copper ore. In this way the protochloride of copper in the solution is converted into dichloride at the expense of the copper in these sulphurets, thereby greatly reducing the consumption of metallic copper in subsequent precipitation of the metallic silver, as above described. At the same time the copper is extracted from such ores or regulus, and, in case these are argentiferous, the silver also, without the cost of furnace treatment.

In this part of the process it must be remembered that an elevated temperature and a considerable excess of common salt or other chlorides are required to keep the dichloride of copper in solution. From the copper solutions, freed from silver, the copper is readily precipitated by scrap iron, less than one part of iron being required to separate two parts of metallic copper.

After the copper has been precipitated the solution will contain, besides chloride of sodium, protochloride of iron and chloride of zinc, provided this metal was present in the ores. By evaporating, out of contact of air as much as possible, till it crystallizes out, the greater part of the salt may be recovered from the solution and used in the furnace, with the addition of a further portion of chloride of sodium, for chloridizing a second charge of ore, as before, while the mother-liquor from the salt containing the protochloride of iron is to be used to form, with the addition of common salt, a bath for its treatment after roasting.

The pulp or residue remaining, after the roasted ore has been treated with the chloride bath, will probably, if the ore was rich in this metal, contain some undissolved chloride of silver. This may be extracted by lixiviation with hot brine, or with a solution of hyposulphite of soda, and any gold, if present, subsequently removed by chlorination, or the pulp or residue may be at once treated by mercury, and the gold and silver obtained together in the form of an amalgam.

In the second case mentioned—that is to say, when the silver ores to be treated contain little or no base metal ores, such as blende or galena—the chlorination in the furnace may be dispensed with if a solution of either or both of the chlorides of copper can be obtained, since these readily chloridize and make soluble silver and its ores.

We prefer to prepare these chlorides by treating oxidized copper ores with a bath of protochloride of iron and common salt, as in the Hunt and Douglas copper process; but when copper ores are not to be had we obtain such a solution by dissolving sulphate of copper and common salt in water. In either case the pulverized silver ores are to be digested for some hours at a heat approaching boiling with frequent agitation, when the silver is chloridized and the copper wholly converted into dichloride, and at length precipitated as a sulphuret with the residues, from which it may be separated by calcining in the air, and subsequently treating with a bath of protochloride of iron and common salt, as directed above for oxidized copper ores, by which means a solution of chloride of copper is got to treat a fresh portion of silver ore.

Both the solutions containing chloride of silver and the residues are to be treated as already described. In this method of extracting silver, the only reagent consumed is the protochloride of iron.

The advantages which we claim for the system above described, are, first, that in chlorinating in the furnace silver ores containing base metals, such as zinc and lead, a more perfect chlorination is effected by mixing them with ores holding copper and iron, and subsequent treatment with the bath of protochloride of iron; second, that all the copper in the charge is recovered at a slight cost; third, that as much copper is extracted from unroasted copper ore or regulus as is contained in the state of protochloride in the solution from the roasted ore, and, moreover, that unroasted silver-bearing ores or regulus may be decomposed by this solution containing chlorides of copper; fourth, that metallic silver perfectly free from base metals is obtained by the precipitation with copper, and, moreover, that the silver left undissolved in the residues will yield a much purer amalgam than if the roasted ore had not been previously treated with the bath; fifth, that gold, if present in the ore, is left in the best condition either to be chlorinated, or to be amalgamated with the chloride of silver remaining in the residues; sixth, that by the removal of the base metals before amalgamation a saving of mercury is effected; seventh, that a great saving of salt is effected through the recovery, by evaporation, of the chlorides usually thrown away in the waste liquors; eighth, that in treating simple ores of silver, or ores of silver containing but little base metal, as lead or zinc, the costly operation of roasting with salt may be dispensed with, and the inexpensive protochloride of iron may be used to produce the chloride of copper necessary for their treatment.

The bath formed of protochloride of iron and chloride of sodium will dissolve the copper and silver from ores mixed or unmixed with other metals, and will eliminate gold, silver, or copper from mixed or unmixed ores, whether the ordinary amalgamation process is employed or not.

Having thus described our invention, what we claim is—

The process of eliminating copper or silver from ore by immersing the ore in a bath of protochloride of iron and chloride of sodium.

J. DOUGLAS, JR.
  THOMAS STERRY HUNT.
  JAMES OSCAR STEWART.

Witnesses as to J. DOUGLAS, Jr.:
 JAS. B. LLOYD,
 I. L. DAWSON.
Witnesses as to THOMAS STERRY HUNT:
 G. M. CROCKER,
 R. W. RAYNER.
Witnesses as to JAMES OSCAR STEWART:
 D. H. MITCHELL,
 JERRY G. MAHANY.